Figure 1:
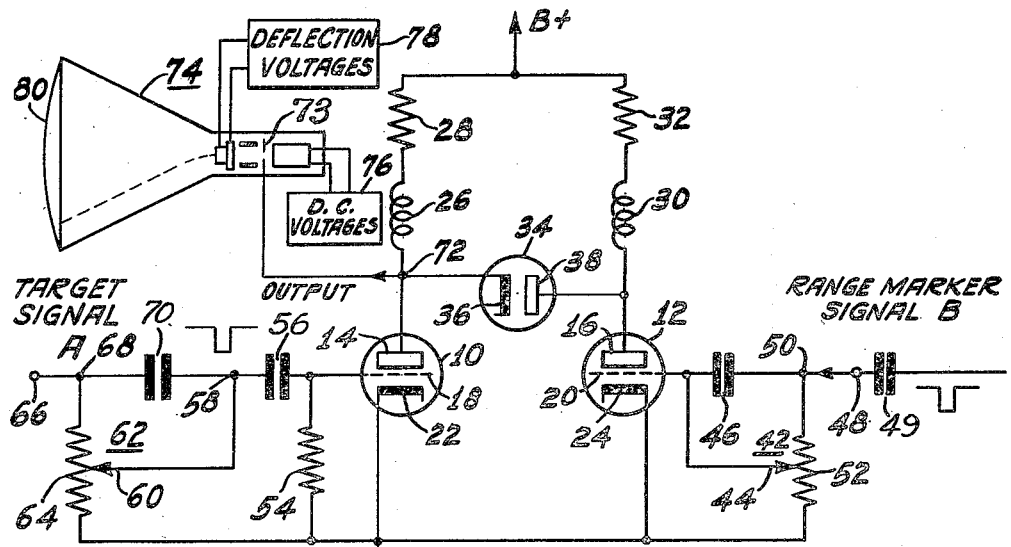

Nov. 30, 1954  E. M. SEABURY  2,695,953
SIGNAL MIXING CIRCUITS
Filed Feb. 3, 1951  2 Sheets-Sheet 1

INVENTOR
Edwin M. Seabury
BY J. L. Whittaker
ATTORNEY

United States Patent Office 2,695,953
Patented Nov. 30, 1954

2,695,953

SIGNAL MIXING CIRCUITS

Edwin M. Seabury, Flushing, N. Y., assignor to Radio Corporation of America, a corporation of Delaware Application February 3, 1951, Serial No. 209,241

8 Claims. (Cl. 250—20)

The present invention is related to signal mixing circuits and more particularly to non-additive mixing circuits.

Circuit problems frequently arise in which it is desirable to mix two signals together in other than an additive manner. For example, it may be desired to apply two intensifying signals to the control grid of a cathode ray tube employed to display information in a P. P. I. (plan position indicator) radar (radio echo detection and ranging) system. One intensifying signal corresponds to the echo received from a target. The other intensifying signal corresponds to range markers. Occasionally both signals are applied at the same time which causes the indication on the fluorescent screen of the cathode ray tube to be undesirably bright under some circumstances.

A discussion of such non-additive circuits and their employment may be found in Vacuum Tube Amplifiers, edited by Valley and Wallman, volume 18 of the Radiation Laboratory Series, starting near the bottom of page 100. In the conventional non-additive mixing circuits, the output voltage is due only to the larger signal of the two input signals. The non-additive mixing circuit of the present invention functions in a different manner.

It is an object of the present invention to provide an improved signal mixing circuit.

It is another object of the invention to improve the operation of signal mixing circuits.

It is a further object of the invention to combine in a novel circuit some of the characteristics of an entirely non-additive mixing circuit and some of the characteristics of an additive mixing circuit.

In accordance with the invention, a rectifying element is connected between the respective load circuits of a pair of amplifying elements. As a result, when a signal is present at the output of the first amplifying element, a signal from the other produces no output until its amplitude exceeds that of the first output signal by a predetermined amount in which event the outputs are added. In a preferred form of the invention, a pair of triode amplifying circuits are employed. A crystal diode is connected between the anodes of the triodes. First, when a negative pulse input signal is applied to the grid of the first tube (to the anode of which the diode cathode is connected) and when no signal is present at the grid of the second tube, the output is the same as though only the first amplifier were operating. Second, when a negative pulse signal is applied to the second tube grid and none to the first tube grid, then the output is the same as though only the second tube amplifying circuit were operative (but with a load impedance less than that of the load circuit of the second tube). Third, when both signals are present at the same time, the signal output from the second tube is present if and only if it exceeds that from the first tube, in which case the outputs are added, although they may be added non-linearly.

Figure 3:
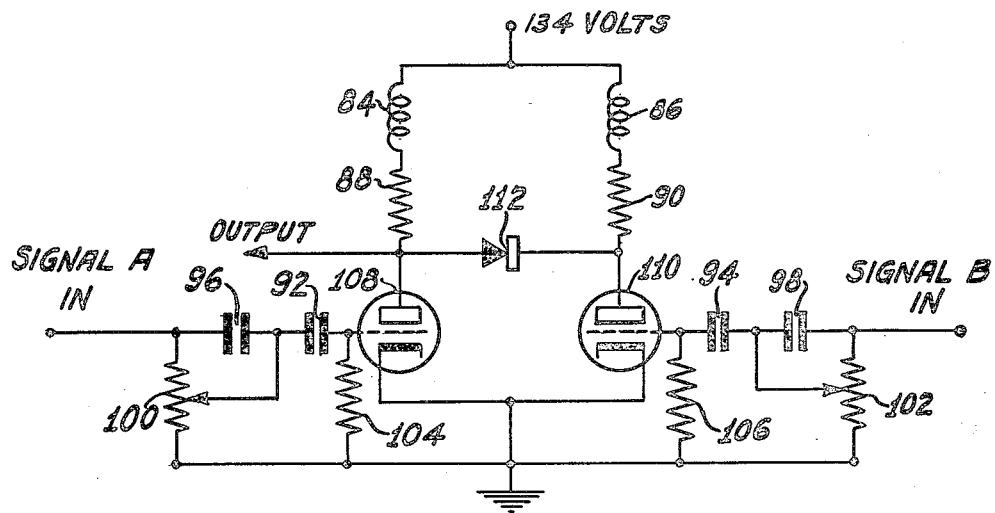
Figure 2:
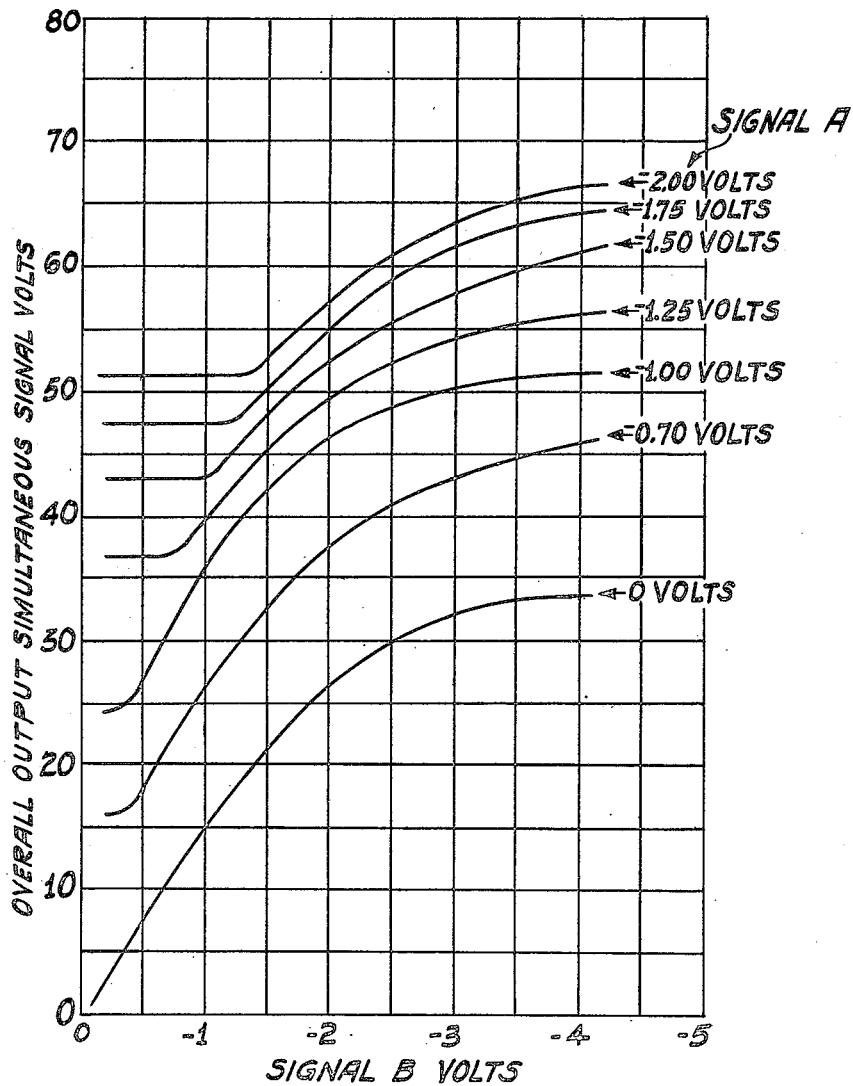

The foregoing and other objects, advantages, and novel features of the invention will be more apparent from the following description when taken in connection with the accompanying drawing in which Fig. 1 is a circuit diagram schematically illustrating a nonsymmetrical preferred form of the invention; Fig. 2 is a family of curves useful in understanding the operation of the invention; and Fig. 3 is a symmetrical form of the circuit of the invention to which the curves of Fig. 2 pertain.

Referring now more particularly to the drawing, a pair of first and second vacuum tubes 10, 12, have respectively anodes 14, 16; grids 18, 20; and cathodes 22, 24. The cathodes are connected together to a conventional ground return conductor. The first tube anode 14 is connected to a B+ supply through a load impedance of a serially connected resistor 28 and peaking inductor 26. The second tube anode 16 is similarly connected through a load impedance of a serially connected peaking inductor 30 and resistor 32 to the B+ supply. A rectifying element, such as a crystal diode 34 is connected between the tube anodes 14, 16. The diode cathode 36 is connected to the first tube anode 14, and the diode anode 38 is connected to the second tube anode 16. The arm 44 of a potentiometer 42 is connected directly to the grid 20. A capacitor 46 is connected between the second tube grid 20 and a signal input terminal 48. A blocking capacitor 49 which is part of the circuit supplying signal B is shown. One terminal of a resistor 52 of the potentiometer 42 is connected at a junction 50 to the terminal 48, the other resistor terminal of the resistor 52 being grounded. A conventionally connected grid resistor 54 is connected between the grid 18 and ground. A blocking capacitor 56 (required because the circuit supplying signal A and not shown does not have one) is connected between the grid 18 and a junction 58 to which is connected an arm 60 of a potentiometer 62. Resistor 64 of the potentiometer 62 is connected between ground and a signal input terminal 66 at a junction 68. A capacitor 70 is connected between the junctions 58 and 68. The output of the circuit is taken from the junction 72 between the crystal diode cathode 36 and the first tube anode 14, for example, for application to a beam intensity grid 73 of a cathode ray tube 74. Suitable direct current voltages from a source 76 and deflection voltages from sources 78 are connected to the cathode ray tube 74. Circuit values which have been found suitable in the circuit illustrated are: for resistors 23 and 32, 2.0 and 3.3 kilohms; inductors 26 and 30, each 20 microhenries; the crystal diode 34 is the type 1N34A; the tubes 10 and 12 are each one half of a type 6J6; the resistor 54 is 390 kilohms; the capacitors 46 and 56 are .01 microfarad; the potentiometers 64 and 52 have total resistances respectively of 75 ohms and 10 kilohms; the capacitors 49 and 70 are each 47 micromicrofarads.

In operation, inductors 26 and 30 afford peaking or frequency compensating effects to maintain pulse shapes. The potentiometer 62 and capacitor 70 are connected in a circuit affording some amplitude control, the capacitor 70 giving some frequency compensation (see pages 93–94 of the above-mentioned Vacuum Tube Amplifiers). The potentiometer 52 and capacitor 46 are connected in a circuit giving simultaneously compensation, grid return path, and amplitude control. The compensating effects mentioned may be ignored for purposes of qualitative explanation of the invention. Also for purposes of explanation one may ignore stray and interelectrode capacities. The signals arriving at grid 18 are negative-going pulse signals which when converted to positive-going signals, are to be applied to the intensity control grid of a cathode ray tube in a P. P. I. radar system to indicate detected targets. The sweep circuits of the cathode ray tube are to provide radial range sweep lines which are to be intensified at points of predetermined radius from the center of the tube to range. The radial direction of the sweep lines is to conform to the antenna beam direction at any instant. Thus, range markers appear as circles on the tube face visible to the eye by reason of the beam intensification of the cathode ray tube.

Let it be supposed that signals A representing detected targets arrive at grid 18 at some range different from that of the range marker signals, the range marker signals being signals B. Signals A impressed on the grid 18 are negative-going because a decrease of current of the tube 10 causes a positive-going pulse at the junction 72 and at the output, thereby to cause a visible spot to appear on the cathode ray tube screen 80. The signals B are also negative-going and under conditions when not coincident with the signals A similarly cause a decrease of current through tube 12 and a positive-going pulse at the anode 16 of the second tube. With signals B applied under these conditions, however, the tube 12 draws current both through its own load impedance comprising the inductor 30 and the resistor 32 and from the junction 72 through the diode 34. Thus, the load impedance under these conditions for the tube 12 is in reality the parallel circuits of the load impedances for the two tubes. However, the current thus drawn through diode 34 causes a positive-going pulse to appear at the output and at junction 72 and a suitable range mark on the screen 80. Note that the pulse output at 72 due to signals B under these conditions is due only to the decreased current through resistor 28 and inductor 26.

Now let it be supposed that two pulses of signal A and signal B arrive coincidentally, and that the signals A at grid 18 are about as great or greater in amplitude than the signals B at grid 20. Under these conditions, the positive-going output pulse due to the current through tube 10 causes the voltage at junction 72 to be at least as great as the voltage at the second tube anode 16. Thus the diode 34 does not draw current because none of the output voltage is contributed by reason of the signals B. On the other hand, if the signals B exceed in amplitude by some predetermined amount the signals A, they will contribute to the output in an amount dependent on the extent of their excess. It will be understood that because of contact potentials and the like, the voltage at the second tube anode 16 must exceed that at junction 72 by a predetermined amount before actual addition of the incoming coincidence signals occurs. The predetermined amount may be fixed by a suitable biasing circuit (not shown) for the crystal diode 34.

It will also be observed that the circuit provides a particularly advantageous means for mixing in which negative-going pulses are to be amplified. Furthermore, in practice it is found that with the circuit of the invention, a peculiar and desirable result is achieved. If the target signal appears to move on the face of the P. P. I. cathode ray tube and its motion intersects the range marker lines, it seems to the observer as though the separate traces can be observed throughout the intersection.

The circuit of the invention may be employed for other purposes than the one hereinbefore mentioned. For example, if signals were applied to grid 18 of tube 10, the gain and linearity of amplification could be readily controlled by voltage applied to grid 20 of tube 12. With a suitable selection of tubes to provide desired tube characteristics, and with suitable choice of circuit values, especially for resistors, the inherent non-linearity in the signal output can be made to simulate various functions of two variables. Again, if D. C. or slowly varying voltage is applied to grid 18 of tube 10, negative signals amplified by tube 12 are clipped at a voltage determined by that applied to grid 18 of tube 10. Negative signals below that amplitude would be rejected. The result in respect to this clipping is analogous to using grid bias on a single tube to reject positive signals below a certain amplitude, but the circuit of the invention first is for negative-going input and secondly prevents any positive overshoot adjacent to the negative input pulse signals to tube 12 from mixing with the negative pulse input signals to tube 10 even when the latter approach zero. Therefore, in the illustrated employment of the circuit, target and range mark signals may be very close to each other without obscuring one by the other on the face of the display tube.

The family of curves of Fig. 2 are illustrative of the characteristics of a circuit according to the invention illustrated in Fig. 3. The circuit of Fig. 3 is slightly different from that illustrated in Fig. 1. In Fig. 3 the circuit is substantially symmetrical except for the diode. The connections and operation need not be described, as these will be clear from Fig. 3 and from the description of Fig. 1. In Fig. 3 the circuit values are: inductors 84 and 86—20 microhenries each; resistors 88 and 90—2 kilohms each; capacitors 92 and 94—0.1 microhenry each; capacitors 96 and 98—47 micro-microhenries each; resistor 100—75 ohms; resistor 102—72 ohms; resistors 104 and 106—390 kilohms each. Tubes 108 and 110 are a 6J6 type. Crystal detector 112 is a type IN34. The inputs are rectangular negative-going pulses. The amplitudes in voltages indicated in Fig. 2 are for peak volts input and peak volts output.

It will be apparent that the invention as described includes a non-additive mixing circuit which is particularly desirable for the mixing of two sets of negative-going pulses for cathode ray tube intensifications. In the presence of simultaneous signals, one of the sets of signals is either cut off or the effective overall amplification is reduced. The practice of the invention avoids "tube blooming" and may find many other advantageous uses.

What is claimed is:

1. A non-additive mixing circuit comprising a pair of amplifying tubes each having a cathode, an anode, and a control electrode, a pair of anode-cathode circuits each of linear elements for the respective tubes and each comprising a linear load impedance and connection means for a source of voltage, and a rectifying element connected between said anodes in shunt with said load impedances and connecting the said anodes for preferential direct current flow in one and only one direction.

2. A non-additive mixing circuit comprising a pair of vacuum tubes each having an anode, a cathode, and a control element, the cathodes being connected to a common connection, a pair of linear load impedances each having one terminal connected respectively to said anodes and having another terminal connected directly together, and a rectifying element in shunt with said load impedances at said one terminal and connecting the said anodes for preferential direct current flow in one and only one direction.

3. A non-additive mixing circuit comprising a pair of amplifying devices each having cathode, anode, and control elements, a linear anode load impedance connected at a junction to the anode of the first of said pair of tubes, a second linear anode load impedance connected at a junction to the anode of the second of said tubes, means to connect the other terminals of said load impedances to a source of B+ supply, and a rectifying element connected for preferential direct current flow in one and only one direction between said anode junctions in a path between said anodes for said preferential current flow shunting said load impedances.

4. The circuit claimed in claim 3, said rectifying element being a crystal diode.

5. The circuit claimed in claim 3, further comprising an output connection at that one of said anodes from which electron current preferentially flows through said rectifying element to the other said anode.

6. The circuit claimed in claim 5, further comprising a cathode ray tube having a beam intensity control element connected to said output connection.

7. A non-additive mixing circuit comprising a pair of amplifying devices each having anode, cathode and control elements, a pair of linear anode-to-cathode circuits connecting respectively each anode element to the cathode element of the same device and each including a linear anode load impedance separate from the other load impedance, and a rectifying element connecting said load impedances in shunt and connected between said anodes for preferential direct current flow in one and only one direction between one said anode element and the load impedance connected thereto of one device and the other said anode element and load impedance connected thereto of the other said device.

8. A non-additive mixing circuit comprising a pair of amplifying devices each having cathode, anode, and control elements, a pair of linear anode-to-cathode circuits connecting respectively each anode element to the cathode element of the same device and each including a linear load impedance separate from the other load impedance, and a rectifying element connected between said load impedances for preferential direct current flow in one and only one direction between one of the cathode and anode elements and the load impedance connected thereto to one of said devices and the corresponding element and the load impedance of the other said device, said rectifying element connecting said load impedances in shunt and being connected between said corresponding elements, and two independent input circuits, each said control element being connected to a different one of said input circuits, said rectifying element being connected by direct connection between said corresponding device elements without the interposition of any other impedance.

References Cited in the file of this patent

UNITED STATES PATENTS

| Number | Name | Date |
|---|---|---|
| 2,324,314 | Michel | July 13, 1943 |
| 2,441,246 | Miller | May 11, 1948 |
| 2,480,837 | Busignies | Sept. 6, 1949 |
| 2,488,448 | Townes et al. | Nov. 15, 1949 |
| 2,502,443 | Dunn et al. | Apr. 4, 1950 |
| 2,532,534 | Bell | Dec. 5, 1950 |
| 2,538,028 | Mozeley | Jan. 16, 1951 |